United States Patent [19]

Brandt et al.

[11] Patent Number: 4,865,724

[45] Date of Patent: Sep. 12, 1989

[54] METAL WORKING MACHINE LIQUID FILTERING DEVICE WITH COALESCER, FILTER, AND TIME DELAYER

[75] Inventors: Robert H. Brandt, Pemberville; Merlin P. Hoodlebrink, Bradner, both of Ohio

[73] Assignee: Brandt & Associates, Inc., Pemberville, Ohio

[21] Appl. No.: 208,089

[22] Filed: Jun. 17, 1988

[51] Int. Cl.$^4$ ............... B01D 21/34; B01D 33/38
[52] U.S. Cl. ............... 210/104; 210/105; 210/110; 210/111; 210/114; 210/117; 210/140; 210/259; 210/305; 210/401
[58] Field of Search ............... 210/776, 401, 387, 305, 210/282, 259, 104, 105, 109, 110, 111, 114, 117, 136, 137, 138, 139, 140, DIG. 5

[56] References Cited

U.S. PATENT DOCUMENTS

| | | | |
|---|---|---|---|
| 3,087,620 | 4/1963 | Hirs | 210/138 |
| 3,690,466 | 9/1972 | Lee et al. | 210/387 |
| 3,971,719 | 7/1976 | Peters | 210/121 |
| 3,972,816 | 8/1976 | Mail et al. | 210/259 |
| 4,333,835 | 6/1982 | Lynch | 210/305 |
| 4,361,488 | 11/1982 | White et al. | 210/776 |
| 4,477,350 | 10/1984 | Brandt et al. | 210/401 |
| 4,571,302 | 2/1986 | Willison | 210/136 |
| 4,663,056 | 5/1987 | Leech | 210/121 |
| 4,715,964 | 12/1987 | Harms | 210/387 |
| 4,717,475 | 1/1988 | Brant et al. | 210/282 |
| 4,751,006 | 6/1988 | Becker | 210/387 |
| 4,772,402 | 9/1988 | Love | 210/104 |
| 4,773,992 | 9/1988 | Dietrick et al. | 210/138 |

Primary Examiner—Richard V. Fisher
Assistant Examiner—Cynthia L. Nessle
Attorney, Agent, or Firm—Allen D. Gutchess, Jr.

[57] ABSTRACT

Versatile filtering apparatus is provided, particularly for processing liquid or coolant used with metal-working machines. The apparatus is adaptable for processing coolant in a wide variety of coolant systems to meet a variety of requirements of metal-working machines in a plant. The apparatus includes a dirty liquid tank in side-by-side relationship with a clean liquid tank, a coalescing unit, a filtering unit, an automatic supply or fill valve for supplying liquid to the apparatus from the coolant system, and an automatic discharge valve for supplying processed liquid from the apparatus back to the coolant system. The coalescing unit separates free oils from the liquid and the filtering unit separates solid particles from the liquid. The processed liquid is then discharged back to the coolant system along with fresh coolant. The overall processing time, along with the time for operating the coalescing unit and the filtering unit, can be changed to adapt the filtering apparatus to meet the particular requirements of particular coolant systems.

7 Claims, 3 Drawing Sheets

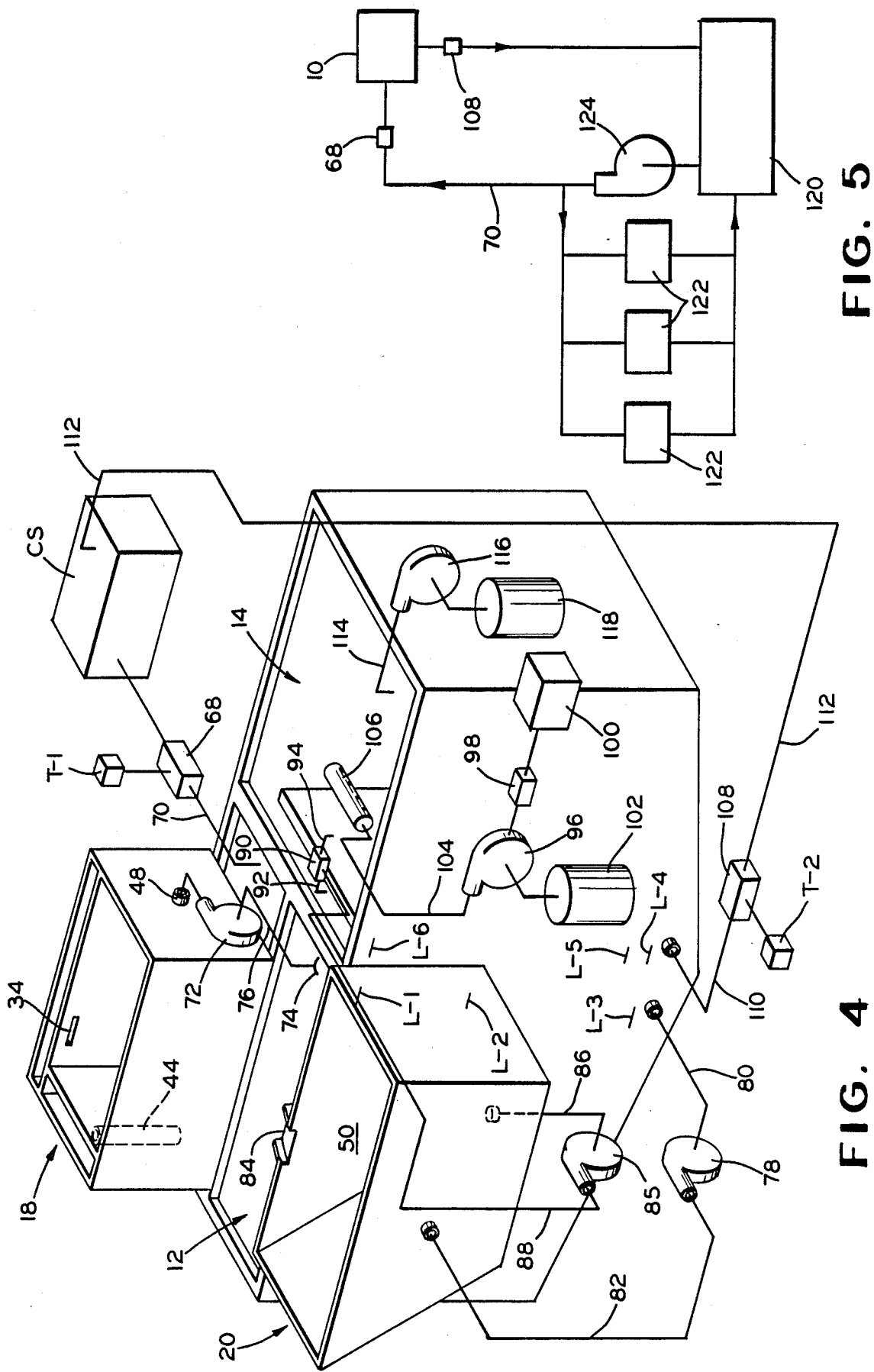

METAL WORKING MACHINE LIQUID FILTERING DEVICE WITH COALESCER, FILTER, AND TIME DELAYER

This invention relates to versatile filtering apparatus which is particularly adapted for use with a wide variety of coolant systems employed with metal-working machines.

Coolant systems for metal-working machines in plants or factories vary widely. There may be any from a few to a couple of dozen machines with which one coolant system is employed and the individual metal-working machines may have individual reservoirs or a single large reservoir may supply some or all of the machines. The nature of contamination of the coolant in the coolant system also varies widely. With some operations, the coolant becomes highly contaminated with oil from the machines and solid particles are of little concern while in other systems, contamination of the coolant by solid particles represents a substantial problem and relatively little oil contamination occurs from the machines. In any system, some of the coolant is lost during the machining operations and the coolant must be supplemented. In other instances, certain special additives in the coolant must be replenished from time to time.

The present invention provides filtering apparatus of a highly versatile nature, being able to accommodate coolant systems employed with few or many metal-working machines and being capable of handling particular contamination problems incurred with particular metal-working systems. The filtering apparatus features automatic fill and discharge valves which render the overall coolant processing operation automatic, with only periodic maintenance being necessary.

The filtering apparatus includes a dirty liquid or coolant tank and a clean liquid or coolant tank, preferably in side-by-side relationship. A coalescent unit is also employed and can be mounted above the dirty liquid tank to save floor space and to facilitate the flow of the contaminated liquid to and from the dirty tank. This unit separates the free oil from the liquid or coolant. The filtering apparatus further includes a filtering unit which is preferably located beside and slightly above the dirty liquid tank, which facilitates flow of liquid to and from the dirty liquid tank. The filtering unit removes solid particles from the liquid or coolant, such particles commonly being in the nature of metal shavings or the like from the parts being processed by the metal-working machines. The pumps and valves supplying the coalescing and filtering units can be timed so that the coalescing unit is operated longer when free oil in the coolant is more of a problem and the filtering unit can be operated longer when solid particles in the coolant are more of a problem.

In accordance with the invention, an automatic discharge valve supplies the liquid or coolant from the clean liquid tank back to the coolant system after the processed, clean liquid or coolant in the clean tank reaches a predetermined level therein. An automatic supply or fill valve supplies dirty liquid from the coolant system to the dirty liquid tank at a predetermined time after the discharge valve has supplied the liquid or coolant from the clean tank back to the coolant system. This period of time may be from a matter of a few minutes to several hours, depending on the size and other requirements of the coolant system. The entire filtering process is thereby automatic with no operator being necessary. Only occasional inspection and the usual periodic maintenance are required.

It is, therefore, a principal object of the invention to provide filtering apparatus for coolant systems employed with metal-working machines, which apparatus is more versatile and automatic in operation than those heretofore known.

Another object of the invention is to provide filtering apparatus capable of use with a wide variety of metal-working machines.

Yet another object of the invention is to provide filtering apparatus capable of handling liquids of widely varying quantities and encountering different types of contaminants, and doing so with minimal requirements for an operator.

Yet a further object of the invention is to provide filtering apparatus embodying units for removing oil and solid contaminants from coolant and for supplying the coolant automatically from a coolant system and back to the system.

Many other objects and advantages of the invention will be apparent from the following detailed description of preferred embodiments thereof, reference being made to the accompanying drawings, in which:

FIG. 4 is a schematic and diagrammatic view of the apparatus of FIG. 1 showing piping, pumps, valves, and controls used therewith; and FIG. 5 is a diagrammatic view of a coolant system with which the apparatus can be used.

Figure 1:
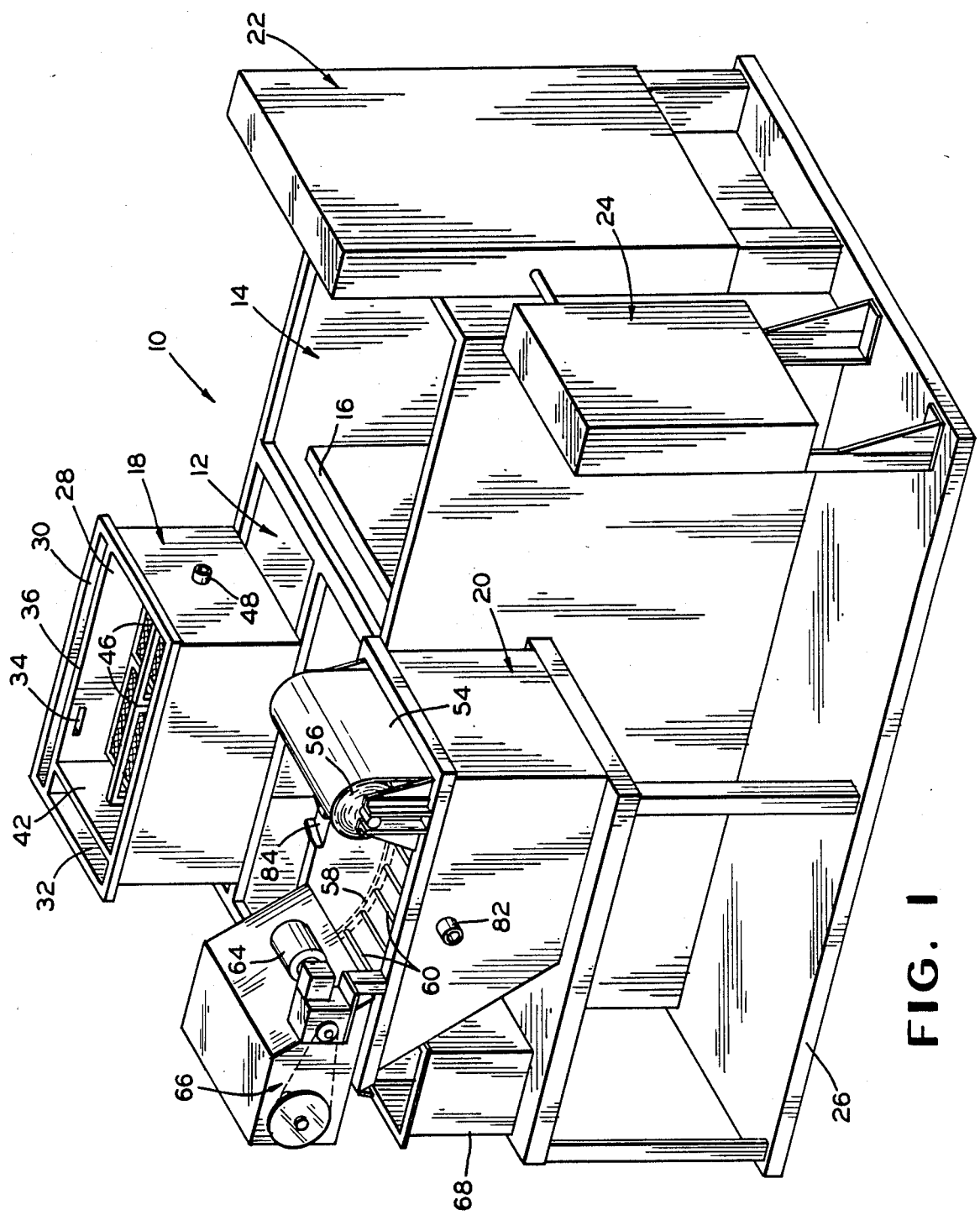
FIG. 1 is a somewhat schematic overall view in perspective of filtering apparatus in accordance with the invention.

Referring particularly to FIG. 1, filtering apparatus in accordance with the invention is indicated at 10. For clarity in illustration, piping, pumps, and valves, including automatic fill and discharge valves are shown in a separate figure, FIG. 4, and will be discussed subsequently. The filtering apparatus 10 basically includes a dirty liquid or coolant tank 12 and a clean liquid or coolant tank 14 which preferably are in side-by-side relationship and separated by a common wall or partition 16, which terminates below the other wall forming the tanks.

A coalescing unit 18 is employed to remove free oil from the coolant, which oil is received in the coolant from the metal-working machines with which the coolant system is employed. As shown, the coalescing unit 18 is mounted above the dirty liquid tank 12, which saves floor space and facilitates the flow of dirty coolant to and particularly from the unit. The processed liquid from the coalescing unit 18 can flow back to the dirty liquid tank 12 by gravity.

A filtering unit 20 is mounted beside and slightly higher at its upper extremity than the dirty liquid tank 12. The filtering unit 20 removes solid particles from the coolant. These particles are usually metal chips received in the coolant contained in the coolant system from the metal-working machines. The position of the filtering unit 20 also renders the overall filtering apparatus 10 more compact and overflow liquid in the filtering unit 20 can flow back into the dirty liquid tank 12 by gravity.

A main control panel 22 is mounted adjacent an end of the clean liquid tank 14 opposite dirty tank 12 and an auxiliary control panel 24 is located adjacent the main panel 22.

With this compact arrangement, the entire filtering assembly 10 can be mounted on a common, single platform 26 to enable the entire apparatus to be fabricated at one location and moved as single piece of equipment to the plant or factory where the apparatus will be employed. The apparatus can also be moved to different locations in the plant or factory as needs change.

Figure 2:
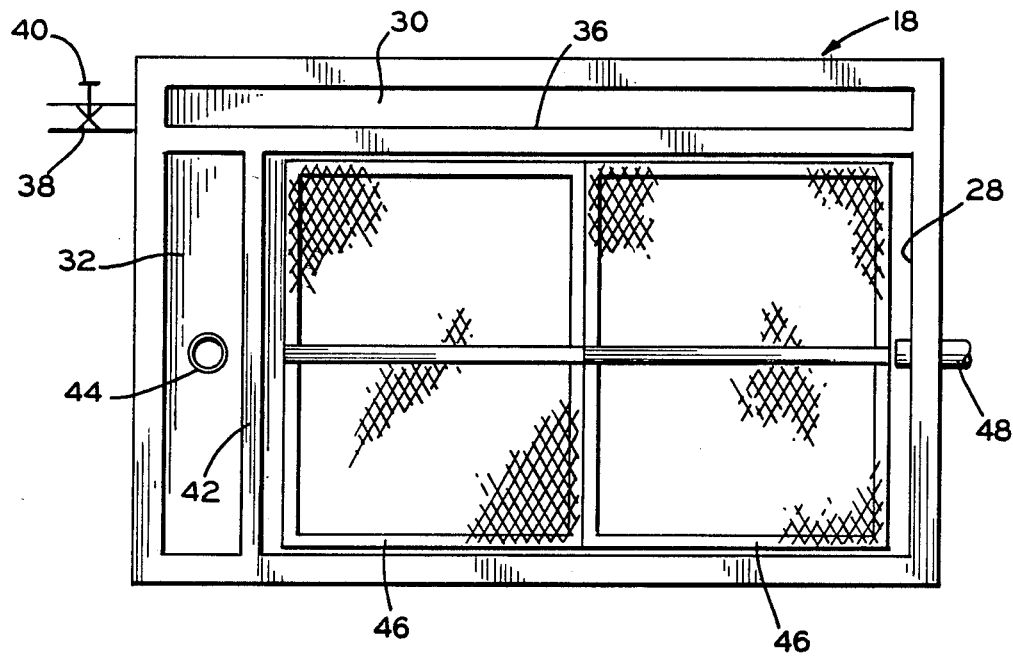
FIG. 2 is a somewhat schematic top view of a coalescing unit of the apparatus of FIG. 1.

The coalescing unit 18 can be of the type shown in our U.S. Pat. No. 4,717,475, issued Jan. 5, 1988, and will not be discussed in great detail. Referring to FIGS. 1 and 2, the unit 18 includes a main tank 28 with an oil chamber 30 at one side thereof and a processed liquid or coolant chamber 32 at one end thereof. The chamber 30 communicates with the main tank 28 through a slot 34 in an upper portion of a common partition 36 so that oil floating on the liquid in the tank 28 can overflow through the slot 34 and into the chamber 30 The oil can be subsequently removed from the chamber 30 through a pipe 38 and a manually-operated valve 40 (FIG. 2). The coolant chamber 32 is separated from the main tank 28 by a common baffle or partition 42 which stops short of the bottom of the tank so that liquid or coolant, relatively free of oil, can flow under the baffle 42 and into the chamber 32. The liquid or coolant in the chamber 32 can then be discharged through a discharge pipe 44 (FIG. 4) extending upwardly therein with an open top. Liquid flowing through the top of the discharge pipe 44 is then discharged by gravity back into the dirty liquid tank 12. The pipe 44 preferably has an upper, adjustable sleeve thereon so that the level of liquid in the chamber 32 can be varied and regulated. The coolant and oil are separated from one another in the tank 28 by oleophilic bodies which are located in coalescent cells 46. These are individually removable from the main tank 28 so that the oleophilic bodies can be cleaned from time-to-time. The dirty liquid coolant to be processed is suppled through an end of the main tank 28 by a supply pipe 48. The pipe 48 preferably supplies the fluid directly into an end of the first of the coalescent cells 46, as discussed more fully in the aforesaid patent.

Figure 3:
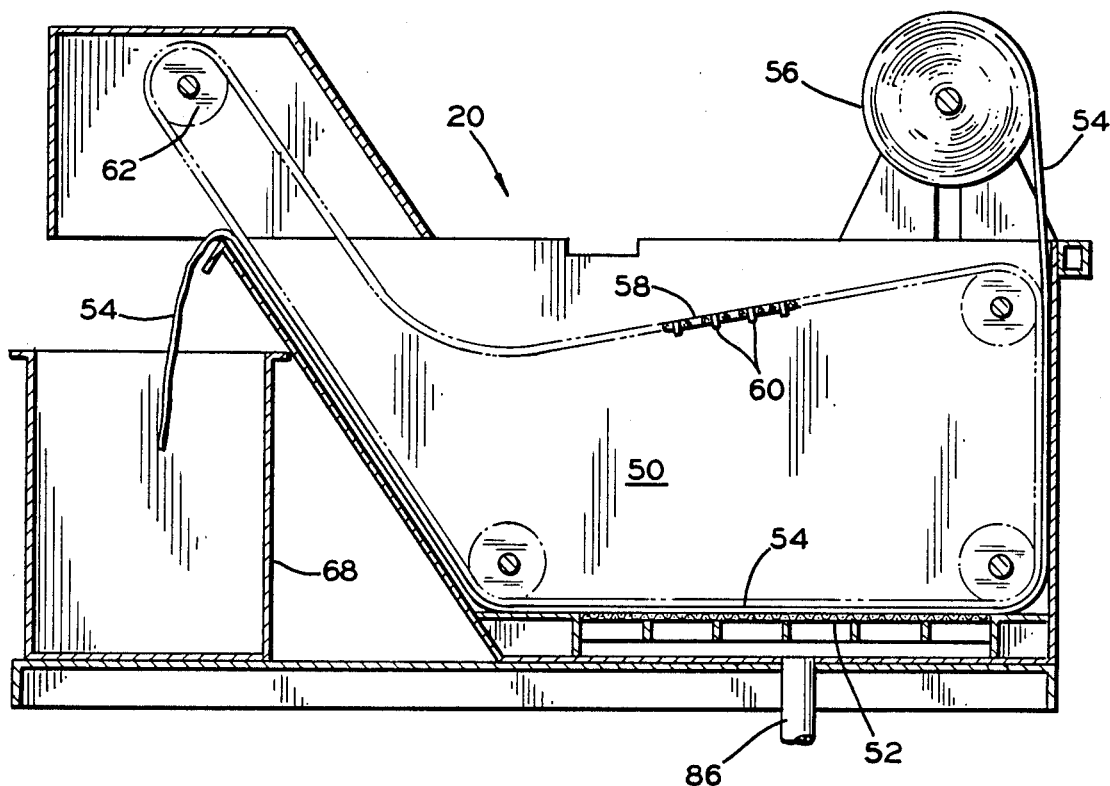
FIG. 3 is a somewhat schematic view in vertical section of a filtering unit of the apparatus in FIG. 1.

The filtering unit 20 is shown particularly in FIGS. 1 and 3 and is of a type known in the art, as shown in U.S. Pat. No. 3,087,620, issued Apr. 30, 1963, by way of example. The filtering unit 20, which will not be discussed in detail, includes a tank 50 with a porous support or grate 52 located above the bottom of the tank to support a section of a strip 54 of filter media. The filter strip 54 is carried from a supply spool 56 to the bottom of the tank 50 and across the supporting grate 52 by spaced conveyor chains 58 having flight bars 60 extending therebetween. The chains 58 are moved by drive sprockets 62 which, in turn, are driven by a suitable motor 64 (FIG. 1) and a suitable mechanical drive indicated at 66. The filter strip 54 is moved down the end of the tank 50, across the grate 52, and up the other end of the tank 50 where it falls into a receptacle 68.

The filter strip 54 is normally not moved continuously across the grate 52. Rather, it is moved periodically through a timer, or else pressure across the strip and grate are sensed and the strip is moved when the pressure differential exceeds a predetermined amount, indicating that the filter media has clogged to a predetermined degree. Filter pumps, to be discussed subsequently, are shut off as the strip is moved.

The operation of the filtering apparatus 10 will now be discussed, particularly in connection with FIG. 4. An automatic fill or supply valve 68 is opened when a timer T-1 times out to supply dirty or contaminated liquid or coolant from a coolant system CS through a supply line 70 to the dirty liquid tank 12. The liquid supplied through the line 70 can be by gravity or by a pump, depending upon the particular installation. The supply valve 68 remains open until the level of liquid in the tank 12 is substantially filled, to a level L-1. This level is sensed by a level sensor as is well known in the art or by a pressure sensor located in the bottom of the tank and actuated when the level or pressure reaches a predetermined value, which occurs when the liquid in the tank reaches the level L-1.

When the dirty tank 12 is filled and the valve 68 is shut off, the liquid in the tank 12 is allowed to settle for a period to allow oil and scum in the dirty liquid to rise to the top. A supply pump 72 is then activated to supply the dirty liquid from a floating skimmer 74 located near the top of the tank 12 through a line 76 and to the supply line 48 for the coalescing unit 18. The pump 72 is preferably of the air-operated diaphragm type which minimizes mixing the coolant and oil as it is supplied to the coalescing unit 18. The pump 76 is controlled by a timer to operate for a period of about twenty minutes to one hour, depending upon the amount of free oil suspended in the coolant.

At the end of that period of time, a level-control pump 78 for the filtering unit 20 is operated. This pump supplies dirty liquid from an outlet line 80 connected to a lower portion of the dirty liquid tank 12 through a supply line 82 to an intermediate portion of the filter tank 50. The tank 50 is supplied with the liquid at a rate such that it overflows through an overflow trough 84 and back into the dirty liquid tank 12. This assures that the level of the liquid in the filtering tank 50 is always at a constant level during the operation of the filter unit 20.

After a period of time sufficient to assure that the filter tank is full, a timer starts a filter pump 85. The pump 85 draws liquid from an outlet line 86 communicating with the bottom of the tank 50 below the filter strip 54. This supplies filtered liquid through a supply line 88 to a three-way valve 90 and, initially, through a first branch line 92 to the dirty liquid tank 12. The rate of flow of the level-control pump 78 exceeds that of the filter pump 85, twenty-five gpm versus twenty gpm, for example, so that the level of liquid in the filter tank 50 always remains constant, at the overflow chute 84.

The coalescing unit 18 and the filtering unit 20 then are continued in operation for a predetermined period of time which can vary anywhere from one to eight hours, depending upon the extent of contamination of the coolant. At the end of this period, the three-way valve 90 is actuated to now supply the filtered liquid from the line 88 through a second branch pipe 94 and into the clean liquid tank 14. The coalescing and filter units 18 and 20 continue to operate and the dirty liquid tank 12 begins to empty until about half-empty, when a level L-2 is reached. A sensor then stops the diaphragm pump 72 and, of course, stops the operation of the coalescing unit 18. The level in the dirty tank 12 continues to drop until a level L-3 is reached near the bottom of the tank, at which time the level-control pump 78 is shut off. The filter pump 85 then continues to operate for a period of time sufficient to empty the filter tank 50.

At any time liquid is withdrawn from the clean tank 14 until the liquid drops to a level L-4, a proportioning or make-up pump 96 is started. The pump 96 is operated by the opening of a solenoid valve 98 which supplies water from a source indicated at 100 through the pump. The pump 96 draws coolant concentrate from a source such as a fifty-five gallon drum 102 and supplies the water and fresh concentrate through a line 104, where they are partially mixed, to a static mixer 106. The mixer is a cylinder with baffles therein to cause additional mixing of the water and concentrate which are then supplied through suitable openings into the clean liquid tank 14. The output of the proportioning pump 96 is small, being in the order of five gallons per minute. This pump is operated until the clean liquid in the clean tank 14 reaches a level L-5.

As the clean tank 14 continues to receive liquid from the branch line 94, the liquid in the tank rises to an upper level L-6. At this time, a timer T-2 is started to operate the proportioning pump 96 for a predetermined short period of time sufficient for the clean liquid in the clean tank 14 to flow over the partition 16 and into the dirty liquid tank 12. This assures that any contaminants on the surface of the liquid in the clean tank flow back into the dirty tank. At that time, an automatic discharge valve 108 is opened, after the timer T-2 times out, to supply the clean coolant from the bottom of the clean tank 14 through a line 110 to a supply line 112 back to the coolant system CS. The discharge valve 108 is closed when the liquid in the clean tank 14 reaches the level L-4. When the discharge valve 108 closes, it actuates the timer T-1 for a given period of time. This period of time can vary from as little as five minutes to three hours or more, depending upon the size and needs of the coolant system. When the timer T-1 times out, it opens the automatic fill valve 68 and the cycle automatically begins once again, with no operator needed for the controls.

In many instances, it is desirable for additional additives to be applied to the clean coolant. In such an instance, an additive line 114 can supply additional material to the clean tank 14 by a pump 116 communicating with a suitable source 118 of the additive. The pump 116 can be actuated manually or programmed into the cycle, if desired.

Such additives can include micro-biocides, rust preventatives, surfactant packages, and metal-working fluid concentrates, by way of example.

A coolant system with which the filtering apparatus 10 can be employed is shown diagrammatically in FIG. 5. This includes a large reservoir or settling tank 120 which supplies a number of metal-working machines 122. A pump 124 circulates the coolant from the reservoir 120 to the machines 122 and back again and also supplies coolant to the filtering apparatus 10 through the line 70 when the valve 68 is opened. The clean coolant is then returned to the coolant system when the discharge valve 108 is opened, either by gravity or by another pump. Also, in many instances, the individual machine tools will have their own reservoirs. Each reservoir can be emptied by a sump-sucker or pump which supplies the coolant to the filtering apparatus. After processing, the coolant can be discharged to the reservoirs of the metal-working tools.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. Filtering apparatus for processing coolant, used with metal-working machines, or other contaminated liquid, said apparatus comprising a clean liquid tank, a dirty liquid tank in side-by-side relationship with said clean liquid tank, a coalescing unit for separating free oil and located, at least in part, above said dirty liquid tank, said coalescing unit including a main coalescing tank, container means in said main tank, a multiplicity of oleophilic bodies in said container means, a supply pipe communicating with said main tank for supplying contaminated liquid thereto, said main tank having an upper opening through which free oil can flow, said main tank having a lower opening through which liquid can flow, means defining a chamber communicating with said lower opening for receiving liquid therefrom, and means forming a discharge opening in an upper portion of said chamber through which liquid can be discharged into said dirty liquid tank, and a diaphragm pump having an inlet receiving liquid from an upper portion of said dirty liquid tank and having an outlet supplying liquid to said supply pipe; a filtering unit located, at least in part, above the level of said dirty liquid tank, said filtering unit including a filtering tank having a layer of filter media therein, a grate in said filtering tank supporting a portion of said filter media, said filtering tank having over-flow means at an upper portion thereof for directing liquid above a predetermined level in said filtering tank into said dirty liquid tank, a filter pump having an inlet communicating with said filtering tank below said grate to receive filtered liquid and having an outlet, a three-way valve communicating with said filter pump outlet and having a first branch pipe communicating with said dirty liquid tank and a second branch pipe communicating with said clean liquid tank, and a level-control pump having an outlet communicating with a portion of said filtering tank above said grate and having an inlet communicating with a lower portion of said dirty liquid tank; a proportioning pump for supplying fresh liquid to said clean liquid tank, an automatic fill valve for supplying contaminated liquid to said dirty liquid tank and for stopping the supply of liquid thereto when the liquid therein reaches a predetermined level, an automatic discharge valve having an inlet communicating with a lower portion of said clean liquid tank and an outlet communicating with a coolant system reservoir, control means for opening said discharge valve after liquid in said clean liquid tank rises to a predetermined upper level and for closing said discharge valve after liquid in said clean liquid tank drops to a predetermined lower level, and timing means for opening said automatic fill valve a predetermined period of time after said discharge valve is closed.

2. Apparatus according to claim 1 further comprising a plurality of metal-working machines, and means for supplying coolant from said reservoir to said machines and through said automatic fill valve when said fill valve is open.

3. Filtering apparatus according to claim 1 characterized by a source of liquid additives and means for supplying additives from said source to said clean liquid tank.

4. In combination, a coolant system comprising a coolant reservoir, a metal-working machine, means for supplying coolant from said reservoir to said machine, and means for supplying coolant from said machine to said reservoir, filtering apparatus for processing the coolant, said apparatus comprising a clean coolant tank, a dirty coolant tank, a coalescing unit for separating free oil from the coolant, means for supplying coolant from said dirty coolant tank to said coalescing unit, means for supplying coolant from said coalescing unit to said dirty coolant tank, a filtering unit for separating particles from the coolant, means for supplying coolant from said dirty coolant tank to said filtering unit, means for supplying filtered coolant from said filtering unit to said dirty coolant tank and, alternately, to said clean coolant tank, an automatic fill valve for enabling the supply of coolant from said coolant system to said dirty coolant tank and for stopping the supply of coolant thereto when the liquid therein reaches a predetermined level, an automatic discharge valve for enabling the supply of clean coolant from a lower portion of said clean liquid tank directly to said coolant system when the clean coolant rises to a predetermined upper level in said clean coolant tank, and for stopping the supply of coolant to said coolant system after the coolant in said clean coolant tank drops to a predetermined lower level, and time delay means for causing said automatic fill valve to enable the supply of coolant again to said dirty coolant tank a predetermined period of time after said discharge valve stops the supply of coolant to said coolant system.

5. The combination according to claim 4 characterized by there being a plurality of metal-working machines and said coolant supply means supplies coolant to said plurality from said reservoir, and to said reservoir from said plurality.

6. Filtering apparatus for processing coolant in a coolant system which comprises a coolant reservoir, a metal-working machine, means for supplying coolant from said reservoir to said machine, and means for supplying coolant from said machine to said reservoir, said filtering apparatus comprising a clean coolant tank, a dirty coolant tank, a coalescing unit for separating free oil from the coolant, means for supplying coolant from said dirty coolant tank to said coalescing unit, means for supplying coolant by gravity from said coalescing unit to said dirty coolant tank, a filtering unit for separating particles from the coolant, means for supplying coolant from said dirty coolant tank to said filtering unit, means for supplying coolant from said filtering unit by gravity to said dirty coolant tank to maintain the level of coolant in said filtering unit at a predetermined level, means for supplying filtered coolant from said filtering unit to said dirty coolant tank and, alternately, to said clean coolant tank, an automatic fill valve for enabling the supply of coolant from the coolant system to said dirty coolant tank and for stopping the supply of coolant thereto when the liquid therein reaches a predetermined level, an automatic discharge valve for enabling the supply of clean coolant from a lower portion of said clean liquid tank directly to said coolant system when the clean coolant rises to a predetermined upper level in said clean coolant tank, and for stopping the supply of coolant to said coolant system after the coolant in said clean coolant tank drops to a predetermined lower level, and time delay means actuated when said automatic discharge valve stops the supply of coolant to said coolant system for causing said automatic fill valve to enable the supply of coolant again to said dirty coolant tank a period of time after said discharge valve stops the supply of coolant to said coolant system.

7. Filtering apparatus according to claim 6 characterized by a source of coolant additives and means for supplying additives from said source to said clean coolant tank.

* * * * *